United States Patent
Fang et al.

(10) Patent No.: US 10,763,956 B2
(45) Date of Patent: Sep. 1, 2020

(54) MECHANISM TO INCREASE THE TRANSMISSION RANGE OF A CELL EDGE STATION IN A WIRELESS NETWORK

(71) Applicant: Intel Corporation, Santa Clara, CA (US)

(72) Inventors: Juan Fang, Portland, OR (US); Minyoung Park, Portland, OR (US); Shahrnaz Azizi, Cupertino, CA (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 15/636,855

(22) Filed: Jun. 29, 2017

(65) Prior Publication Data

US 2019/0007130 A1  Jan. 3, 2019

(51) Int. Cl.
*H04B 7/26* (2006.01)
*H04W 72/04* (2009.01)
(Continued)

(52) U.S. Cl.
CPC .......... *H04B 7/2656* (2013.01); *H04B 7/022* (2013.01); *H04L 1/04* (2013.01); *H04L 1/08* (2013.01); *H04L 1/1858* (2013.01); *H04W 72/04* (2013.01); *H04L 1/0001* (2013.01); *H04L 5/003* (2013.01); *H04L 5/0035* (2013.01);
(Continued)

(58) Field of Classification Search
CPC .......... H04B 7/2656; H04L 1/04; H04L 1/08; H04L 1/0001; H04L 5/003; H04L 5/0073; H04L 27/2602; H04W 72/04; H04W 4/20; H04W 48/16; H04W 72/0406; H04W 74/006; H04W 74/0808; H04W 4/0816;
(Continued)

(56) References Cited

U.S. PATENT DOCUMENTS 9,844,037 B2 * 12/2017 Seok
2012/0243485 A1 * 9/2012 Merlin et al.
(Continued)

OTHER PUBLICATIONS

USPTO; Requirement for Election/Restriction issued in U.S. Appl. No. 15/278,739, dated Jan. 10, 2018; 8 pages.
USPTO; First Non-Final Office Action issued in U.S. Appl. No. 15/278,739, dated Mar. 19, 2018; 16 pages..
USPTO; Final Office Action issued in U.S. Appl. No. 15/278,739, dated Aug. 31, 2018; 15 pages.
(Continued)

*Primary Examiner* — Marsha B Banks Harold
*Assistant Examiner* — Dharmesh J Patel
(74) *Attorney, Agent, or Firm* — Alliance IP, LLC

(57) ABSTRACT

A wireless device, system and method. The device includes a processing circuitry is configured to decode duplicate Request to Send (RTS) frames from a first access point (AP) that is part of an Extended Service Set (ESS) including a second AP, the first AP and the second AP buffering data for the device. The processing circuitry is further to cause transmission of duplicate multi-AP channel bonding (MACB) Trigger frames to the first AP and to the second AP in response to the duplicate RTS frames. Each of the duplicate RTS frames and duplicate Trigger frames have a legacy preamble portion over a first bandwidth of a corresponding wireless channel, and a MACB portion over a second narrower bandwidth of the corresponding wireless channel. The processing circuitry is further to decode a first data frame portion from the first AP and a second data frame portion from the second AP.

25 Claims, 9 Drawing Sheets

(51) Int. Cl.
    *H04L 1/18*     (2006.01)
    *H04L 1/08*     (2006.01)
    *H04B 7/022*     (2017.01)
    *H04L 1/04*     (2006.01)
    *H04L 1/00*     (2006.01)
    *H04L 5/00*     (2006.01)
    *H04W 74/08*     (2009.01)
    *H04W 84/12*     (2009.01)

(52) U.S. Cl.
    CPC .... *H04L 5/0073* (2013.01); *H04L 2001/0092* (2013.01); *H04W 74/0816* (2013.01); *H04W 84/12* (2013.01)

(58) Field of Classification Search
    CPC .. H04W 74/0833; H04W 84/12; H04W 88/08
    See application file for complete search history.

(56) References Cited

U.S. PATENT DOCUMENTS

| | | |
|---|---|---|
| 2014/0036835 A1 | 2/2014 | Trainin et al. |
| 2014/0269464 A1 | 9/2014 | Park et al. |
| 2015/0334650 A1 | 11/2015 | Park |
| 2016/0277170 A1 | 9/2016 | Jia et al. |
| 2016/0295513 A1* | 10/2016 | Moon et al. |
| 2017/0140349 A1 | 5/2017 | Ricci |
| 2018/0092078 A1 | 3/2018 | Fang et al. |

OTHER PUBLICATIONS

USPTO; Second Non-Final Office Action issued in U.S. Appl. No. 15/278,739, dated Jan. 24, 2019; 15 pages.

USPTO; Final Office Action issued in U.S. Appl. No. 15/278,739, dated Jul. 5, 2019; 18 pages.

\* cited by examiner

700 decoding duplicate Request to Send (RTS) frames from a first access point (AP), the first AP being part of an Extended Service Set (ESS) including a second AP, the first AP and the second AP buffering data for the device

702 causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being a narrow bandwidth narrower than the first bandwidth

704 decoding a first data frame portion from the first AP and a second data frame portion from the second AP, a combination of the first data frame portion and the second data frame portion including the data

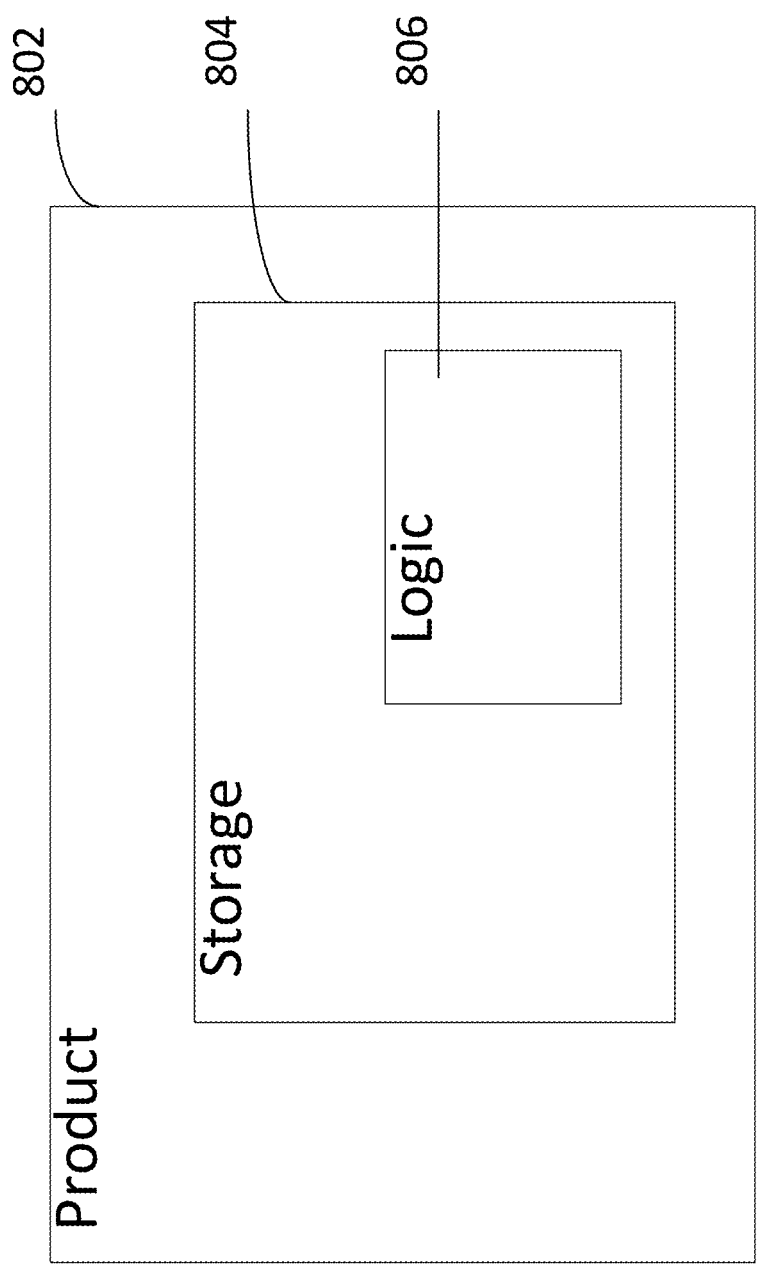

US 10,763,956 B2

MECHANISM TO INCREASE THE TRANSMISSION RANGE OF A CELL EDGE STATION IN A WIRELESS NETWORK

TECHNICAL FIELD

Embodiments concern communications systems. More specifically an exemplary aspect is directed toward wireless communications systems and even more specifically to the Institute of Electrical and Electronics Engineers (IEEE) 802.11 wireless communication set of standards and amendments. Even more specifically, exemplary aspects are at least directed toward devices, products, systems and methods compliant with the IEEE 802.11n/ac/ax set of amendments, and in general any wireless communications system or protocol, such as 4G, 4G LTE, 5G and later, and the like.

BACKGROUND

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (STAs) by coordinating access to a shared radio channel and utilizing protocols that enhance communications over a wireless medium.

IEEE 802.11ax is the successor to IEEE 802.11ac and aims to increase the efficiency of WLAN networks, especially in high density areas such as public hotspots and other dense traffic areas. IEEE 802.11ax uses orthogonal frequency-division multiple access (OFDMA), and is directed towards improvements to spectrum efficiency to enhance system throughput and coverage area in high density scenarios of APs (Access Points) and/or STAs (Stations).

As a result of propagation loss, a STA at the edge of the coverage area of a basic service set (BSS) (a "cell edge" STA or CE STA), the physical data rate to the CE STA tends to be much lower than that to a non-cell-edge STA (non-CE STA). For example, in an environment with four access points (APs) located at the four corners of a large 40 m×40 m room, a STA will follow the rules defined in IEEE 802.11 specification to connect with the nearest AP. The physical data rate to the CE STA in the middle of the room is much lower than that for another STA near one of the four corners, where the STA is closer to an AP. Thus, CE STAs continue to underperform in many networks, and there exists a need to improve throughput and performance associated with the same.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 illustrates a flow-chart of a method according to some demonstrative embodiments; and FIG. 8 illustrates a product of manufacture in accordance with some demonstrative embodiments.

DETAILED DESCRIPTION

Figure 1:
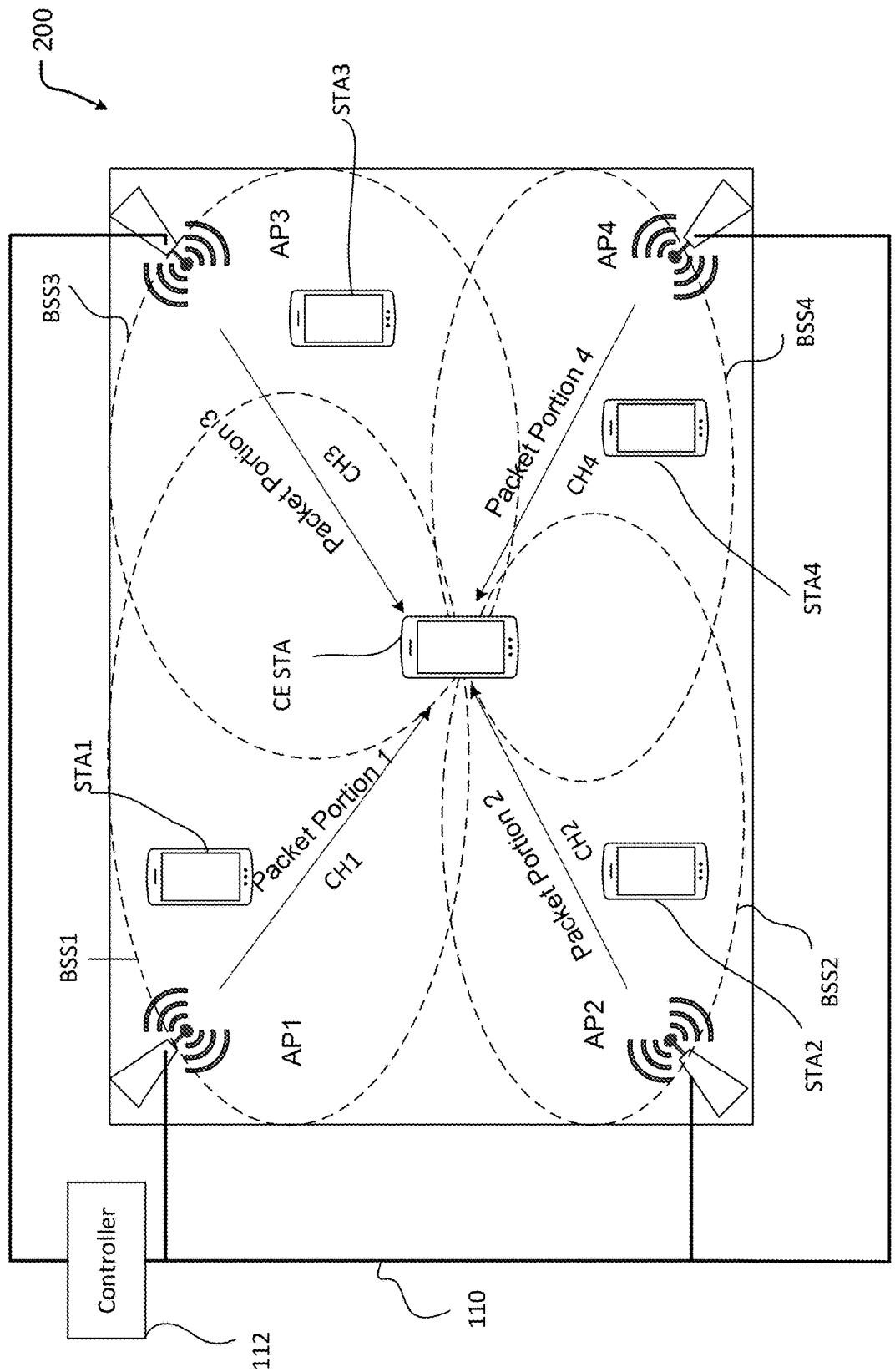
FIG. 1 is a schematic block diagram illustration of a coordinated multi-access point network including one station (STA) and four access points (APs), in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing and/or published IEEE 802.11 standards or amendments (including IEEE 802.11ax, IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012); IEEE802.11 ac-2013 ("IEEE P802.11ac-2013, IEEE Standard for Information Technology—Telecommunications and Information Exchange Between Systems— Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE802.11-ay (P802.11ay Standard for Information Technology—Telecommunications and Information Exchange Between Systems Local and Metropolitan Area Networks— Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™ Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless communication device", as used herein, includes, for example, a device capable of causing wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless communication device" may optionally include a wireless service. Wireless communication devices or systems may include, for example, a baseband processor, a wireless circuit card, a system on a chip (SoC), a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, one or more processors (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute or implement the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Reference is made to FIG. 1, which schematically illustrates a coordinated multiple AP environment 100 including first basic service set, BSS1, a second BSS, BSS2, a third BSS, BSS3, and a fourth BSS, BSS4, in accordance with some demonstrative embodiments. As shown in FIG. 1, in some demonstrative embodiments, BSS1 may include STA1 and AP1. BSS2 may include STA2 and AP2. BSS3 may include STA3, and AP3. BSS4 may include STA4 and AP4. There may be a CE STA as shown at the cell edge of each of the above BSS'. As shown in FIG. 1, there may be multiple APs operating in the environment 100, each within the range of the CE STA, the CE STA being within a range for overlapping coverage of APs 1-4 at the respective "edges" of each BSS "cell" as indicated schematically by edges of the BSS' shown in broken lines in FIG. 1. In the examples provided hereinafter, there may be four or more APs operating on respective channels, such as on respective 20 MHz channels, respective 2 MHz channels, or respective channels of any given bandwidth. The channels may be contiguous or non-contiguous, and provide non-orthogonal multiple-access channels for wireless communication. Embodiments however encompass the use of different bandwidth channels, and/or the use of orthogonal frequency division multiple access (OFDMA) communication within each channel.

In the case of CE STAs, such as CE STA of FIG. 1, such STAs may associate with multiple APs, for example with APs 1-4 shown in FIG. 1. A CE STA therefore may have the capability to operate on multiple contiguous or non-contiguous channels as between the APs with which it is associated, and may therefore access the medium for uplink or downlink data transmission as long as there is one available channel among the available channels. The capability of operating on multiple channels may advantageously improve the performance of a CE STA owing to higher channel access opportunities.

Referring still to FIG. 1, environment 100 may, according to one embodiment, employ a coordinated Multi-Point (CoMP) strategy, which provides joint precoding among coordinated APs, such as APs 1-4, to mitigate inter-cell interference. CoMP is considered as a solution to improve the performance of a CE STA.

Figure 2:
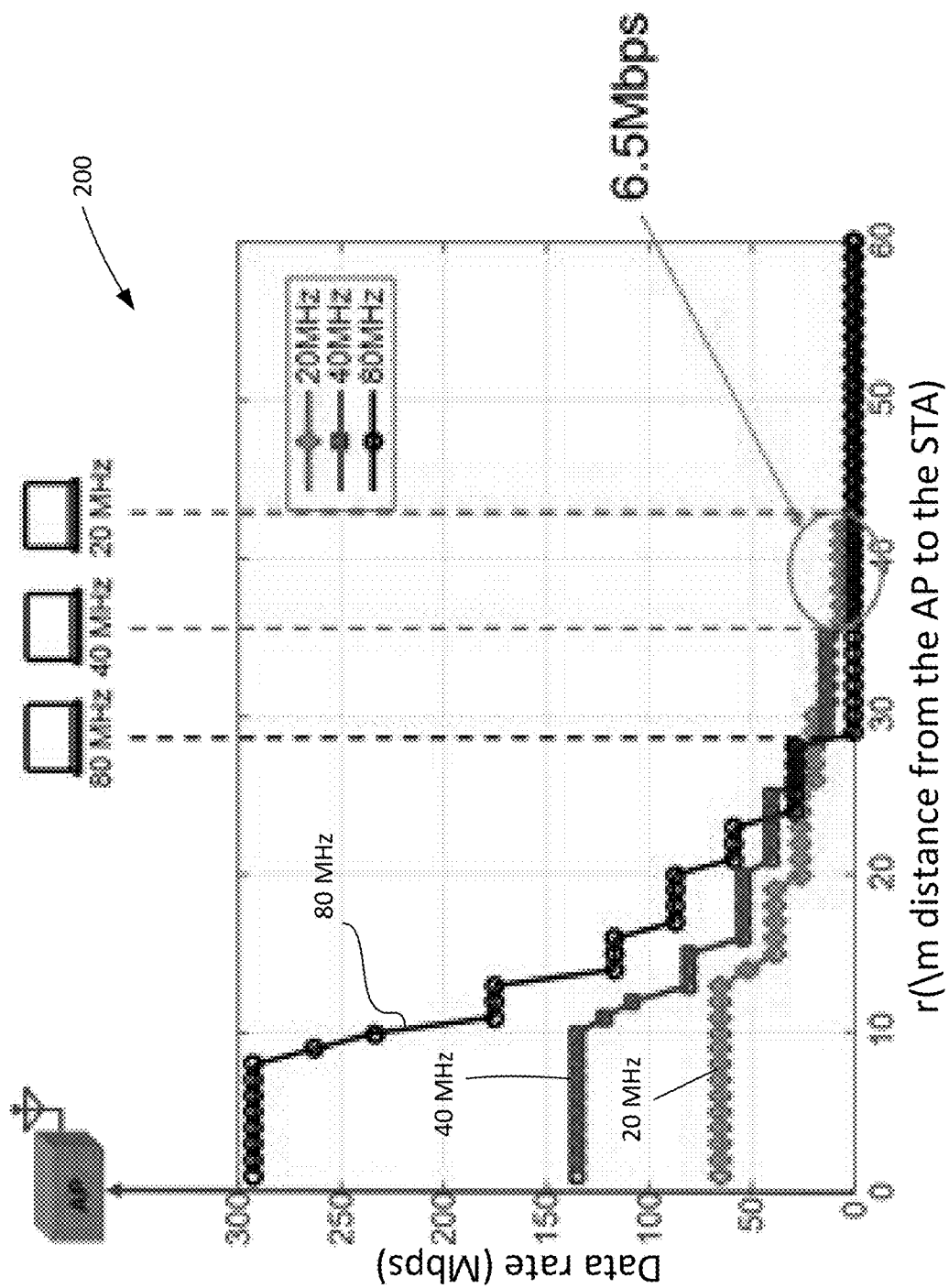
FIG. 2 is a graph plotting physical data rate from an AP to a STA versus a distance between the AP and the STA for various channel bandwidths in conformance with the Institute of Electrical and Electronics Engineers (IEEE) 802.11ac standard amendment or protocol.

Referring next to FIG. 2, a graph 200 is shown plotting physical data rate in Mbps for communication between an AP and a STA against the distance in meters between the AP and the STA for bandwidths of 20 MHz, 40 MHz and 80 MHz according to the IEEE 802.11ac protocol. As suggested in FIG. 2, a CE STA, as suggested by shown data rates at the longer distances from the AP, may suffer from low-throughput performance compared to non-CE STAs mainly as a result of propagation loss, and as a result of interference from overlapping BSS' transmissions. With respect to propagation loss, the supported physical data rate at a CE STA could be much lower than that of a non-CE STA. The above deleterious effect is even more pronounced with wider bandwidths, as compared with a deterioration in data rate going from 20 MHz to 40 MHz, and from 40 MHz to 80 MHz at the cell edge, as may be readily seen from the graph. In addition, to the extent that a CE STA may experience pronounced interference from overlapping BSS' transmissions, such as, for example, the CE STA of FIG. 1 wishing to communicate on CH1, but experiencing interference from CH2, CH3 and CH4, channel access opportunities of CE STAs tend to be much lower than that of non-CE STAs.

Figure 3:
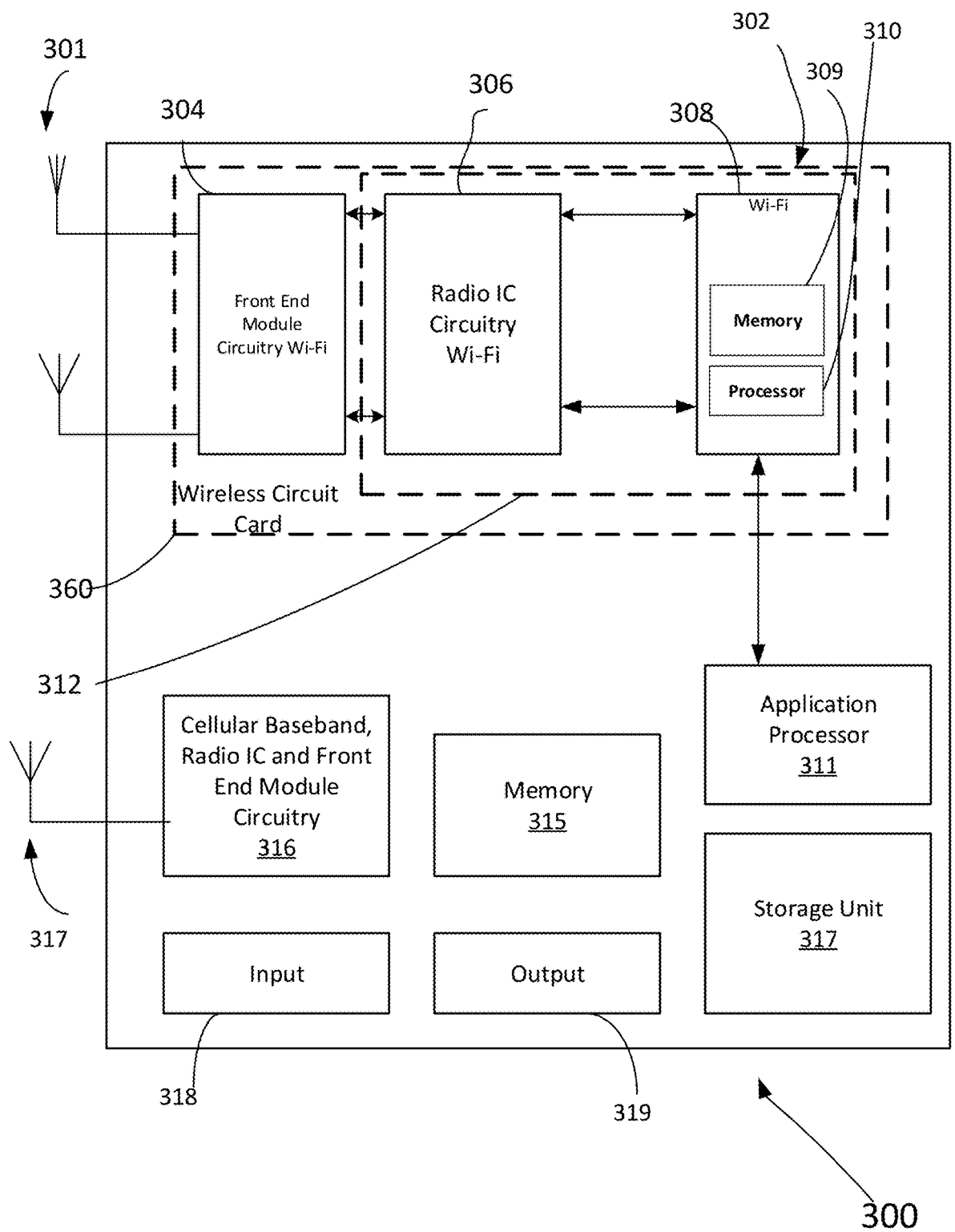
FIG. 3 is a radio architecture for a STA or an AP from the BSS of FIG. 1 in accordance with some demonstrative embodiments.

Reference will now be made to FIG. 3, which depicts one embodiment of a wireless communication system 300 such as CE STA or any of APs 1-4 of FIG. 1. The wireless communication system 300 may include radio system 302. Radio system 302 may include radio front-end module (FEM) circuitry 304, radio integrated circuit (radio IC) 306 and baseband processor or processing circuitry 308. The radio IC 306 and baseband processor 308 may be positioned on the same integrated circuit card (IC) 312, although embodiments are not so limited. The radio IC 306 and FEM circuitry 304 may together be referred to as a transceiver system 307, and it is to be understood that radio IC 306 and FEM circuitry 304 may, in one embodiment, have their functionality integrated, although embodiments are not so limited. The wireless communication system 300 as shown may further include both Wi-Fi functionality and LP-WU (Low Power Wake-up) functionality, although embodiments are not so limited. LP-WUR (Low Power Wake-up Radio)/LP-WU may refer to Medium Access Control Layer and Physical Layer specifications in accordance with efforts within the Institute of Electrical and Electronics Engineers (IEEE)'s regarding a LP-WUR standard/802.11ba standard. According to one embodiment, the FEM, the baseband processor and the radio IC circuitry may be provided on a single chip, such as a wireless circuit card 360.

In FIG. 3, it is further to be noted that the representation of a single antenna may be interpreted to mean one or more antennas. Also, as used herein, "processing circuitry" or "processor" may include one or more distinctly identifiable processor blocks.

The FEM circuitry 304 may include a receive signal path comprising circuitry configured to operate on Wi-Fi signals received from one or more antennas 301, to amplify the received signals and to provide the amplified versions of the received signals to the radio IC 306 for further processing. FEM circuitry 304 may also include a transmit signal path which may include circuitry configured to amplify Wi-Fi signals provided by the radio IC 306 for wireless transmission by one or more of the antennas 301. The antennas may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC 306 as shown may include a receive signal path which may include circuitry to down-convert signals received from the FEM circuitry 304 and provide baseband signals to baseband processor 308. The radio IC 306 may also include a transmit signal path which may include circuitry to up-convert baseband signals provided by the baseband processor 308 and provide RF output signals to the FEM circuitry 304 for subsequent wireless transmission by the one or more antennas 301.

Baseband processing circuitry 308 may include a memory 309, such as, for example, a set of RAM arrays in a Fast Fourier Transform or Inverse Fast Fourier Transform block (not shown) of the baseband processor 308. Processing circuitry 310, may include control logic to process the signals received from the receive signal path of the radio IC 306. Baseband processing circuitry 308 may also include control logic to generate baseband signals for the transmit signal path of the radio IC 306. Processing circuitry 310 may further include physical layer (PHY) and medium access control layer (MAC) circuitry (not shown), and may further interface with application processor 311 for generation and processing of the baseband signals and for controlling operations of the radio IC 306. Baseband processing circuitry may also include digital cancellation logic 342 to provide part of the Self Interference Cancellation functionality, including digital cancellation on the digital baseband IQ samples, as would be recognized by one skilled in the art.

In some demonstrative embodiments, the FEM circuitry 304, the radio IC 306, and baseband processor 308 may be provided on a single radio card, such as radio system 302. In some other embodiments, the one or more antennas 301, the FEM circuitry 304 and the radio IC 306 may be provided on a single radio card. In some other embodiments, the radio IC 306 and the baseband processor 308 may be provided on a single chip or integrated circuit (IC), such as IC 312.

In some demonstrative embodiments, the wireless communication system 300 of FIG. 3 may include a Wi-Fi radio system and may be configured for Wi-Fi communications, and/or may have a cellular radio system and may be configured for cellular communications, although the scope of the embodiments is not limited in this respect. In some other embodiments, the wireless communication system 300 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect. In some demonstrative embodiments, the wireless communication system 300 may include other radio systems, such as a cellular radio system 316 configured for cellular (e.g., 3GPP such as LTE, LTE-Advanced or 5G communications).

In some IEEE 802.11 embodiments, the wireless communication system 300 may be configured for communication over various channel bandwidths including bandwidths having center frequencies of 900 MHz, 2.03125 MHz, 2.4 GHz, 4.0625 MHz, 5 GHz, 8.28125 MHz and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. The scope of the embodiments is not limited with respect to the above center frequencies however.

Referring still to FIG. 3, in some demonstrative embodiments, wireless communication system 300 may further include an input unit 318, an output unit 319, a memory unit 315. Wireless communication system 300 may optionally include other suitable hardware components and/or software components. In some demonstrative embodiments, some or all of the components of wireless communication system 300 may be enclosed in a common housing or packaging, and may be interconnected or operably associated using one or more wired or wireless links. In other embodiments, components of wireless communication system 300 may be distributed among multiple or separate devices.

In some demonstrative embodiments, application processor 311 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 311 may execute instructions, for example, of an Operating System (OS) of wireless communication system 300 and/or of one or more suitable applications.

In some demonstrative embodiments, input unit 318 may include, for example, one or more input pins on a circuit board, a keyboard, a keypad, a mouse, a touch-screen, a touch-pad, a track-ball, a stylus, a microphone, or other suitable pointing device or input device. Output unit 319 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory 315 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units.

Storage unit 317 may include, for example, a hard disk drive, a floppy disk drive, a Compact Disk (CD) drive, a CD-ROM drive, a DVD drive, or other suitable removable or non-removable storage units. Memory unit 315 and/or storage unit 317, for example, may store data processed by wireless communication system 300.

In some demonstrative embodiments, some or all of the components of wireless communication system 300 of FIG. 3 may be enclosed in a common housing or packaging, and may be interconnected or operably associated using one or more wired or wireless links. In other embodiments, components wireless communication system 300 may be distributed among multiple or separate devices.

In some demonstrative embodiments, STAs and APs may be configured to implement one or more Multi-User (MU) mechanisms, such as MU Multiple-Input Multiple-Output (MU-MIMO) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, the link access overhead may be based an acknowledgment mechanism, which may be an integral part of a carrier sense multiple access (CSMA) with collision avoidance (CA) (CSMA/CA) mechanism, which may be implemented at the MAC layer.

Figure 4:
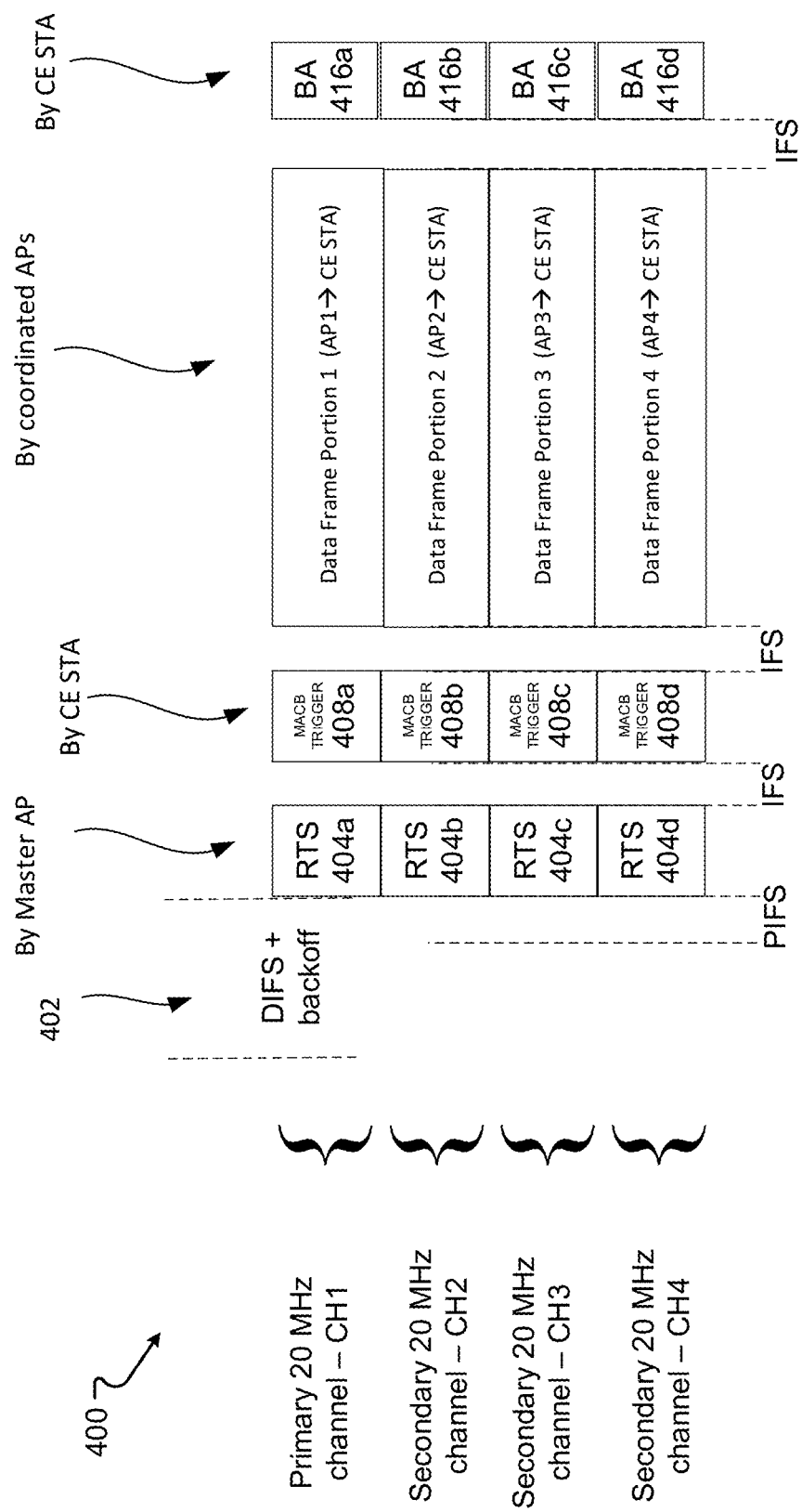
FIG. 4 shows a signal exchange between a STA, such as a CE STA, and four APs according to some demonstrative embodiments.
Figure 5A:
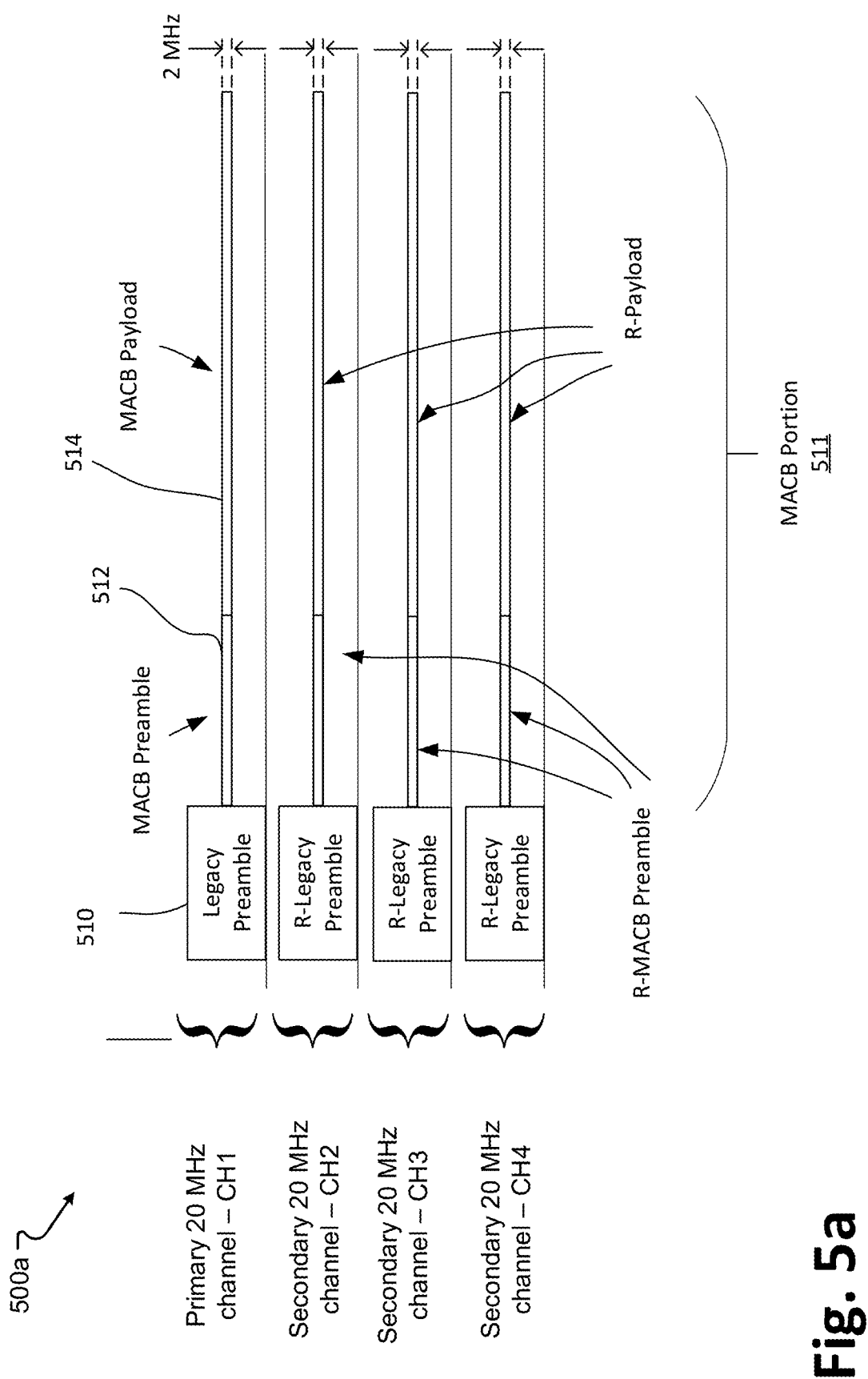
FIG. 5a shows the frame structure of a frame of FIG. 4 in each narrowband subchannel.
Figure 5B:
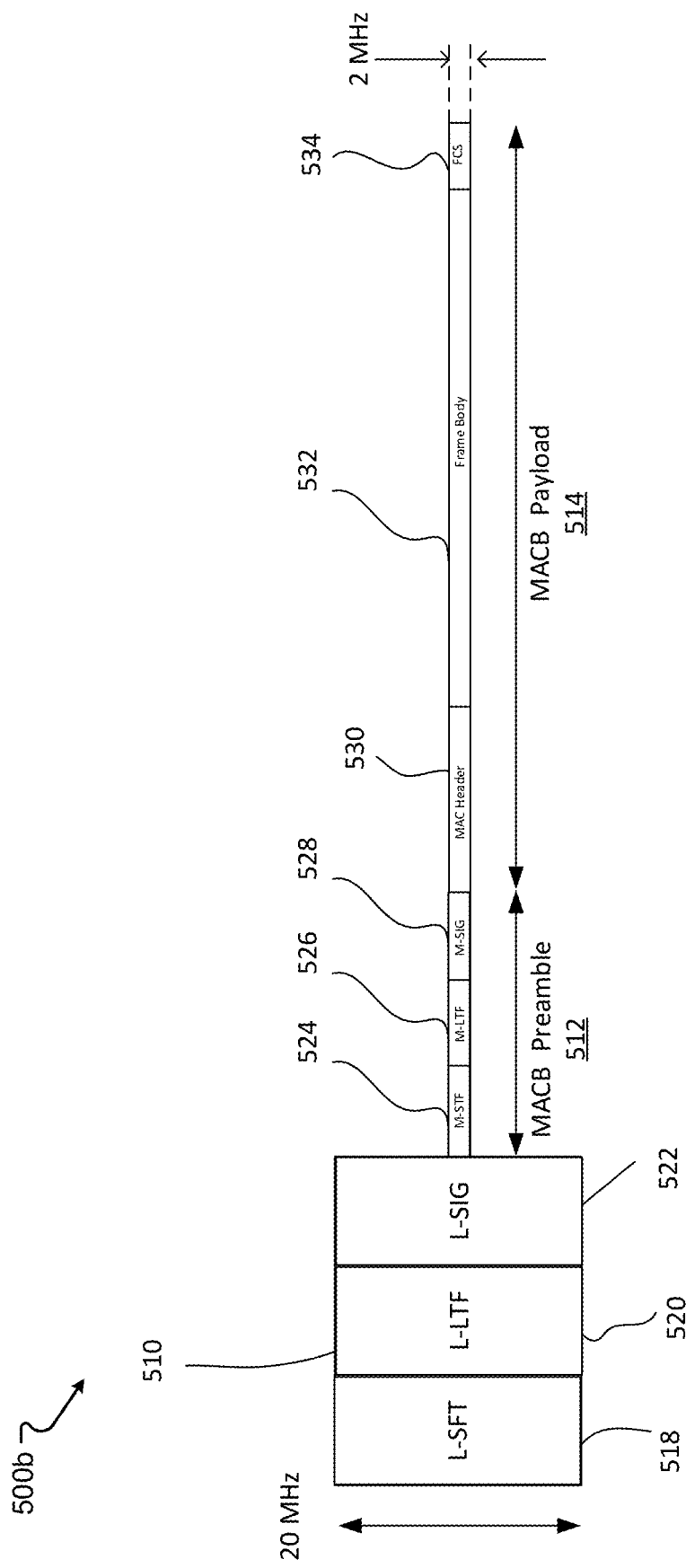
FIG. 5b shows one of the duplicate frames of FIG. 5a in further detail.

Referring next to FIGS. 4, 5a and 5b, respective signaling diagrams are shown of communications between a STA, such as CE STA of FIG. 1, to four APs, such as AP 1-4 of FIG. 1, on respective channels CH1, CH2, CH3 and CH4. FIGS. 5a and 5b show signaling diagrams according to some demonstrative embodiments. It is to be noted that none of the frame fields or subfields shown in the figures herein are necessarily to scale as depicted in either the frequency domain or in the time domain. It is further to be noted that, regardless of FIGS. 4, 5a and 5b, embodiments encompass operations at a STA, such as a CE STA, with access to any number of channels and APs.

Referring back to FIG. 1, the APs may be networked together through a backbone 110 to form an Extended Service Set (ESS) controlled by a controller 112. The ESS is defined by the IEEE 802.11 standard and set of amendments (hereinafter Wi-Fi), and consists of a formation which links a plurality of BSS' together (such as, in this case, BSS1-BSS4) with the backbone. The backbone may include wired Ethernet which connects APs to one another in the ESS. All the clients connected to the same and different BSS' may communicate among each other within the ESS.

By virtue of the APs within the ESS being connected to one another by way of a backbone, the APs may have information on neighbor APs from the same ESS, including information on their respective operational statuses and current loads. This information may be received by AP1 through a central controller 112, that may communicate with the APs in the ESS through a data center network and/or using radio resource measurement messages in a well-known manner. The state of the art provides multiple mechanisms to allow a current AP to collect the necessary information regarding neighbor APs, as would be recognized by one skilled in the art.

Referring still to FIG. 1, according to one embodiment, one of the APs, such as AP1 of FIG. 1, may be selected as the main or master AP. The other APs (e.g. AP2-AP4) may then serve as assisting APs, which may assist AP1 with transmission requests to a CE STA, such as CE STA of FIG. 1. The master AP AP1 may collect channel state information (CSI) from/between all the coordinated APs AP1-AP4 and the CE STA, to allocate resource units (RUs) within an OFDMA packet structure among all the coordinated APs for data transmissions to the CE STA using multi-AP channel bonding. Here, AP1 may only need simplified CSI (e.g. signal to noise ratio) or full channel information such as that used in the Cooperative Multi-Point (CoMP) techniques.

According to some demonstrative embodiments, when AP1 has data destined to be sent to the CE STA, which may be located in the center of the room, AP1, STA1, and all other APs 2-4 may complete the steps explained hereinafter to enable multi-AP channel bonding (MACB) transmissions to provide a high physical data rate to the CE STA.

Referring to the signal exchange 400 of FIG. 4, first, AP1 may divide the data into several portions (portions of the data packet) and transmit the corresponding data frame portions to different assisting APs 2-4 through the backbone 110 (FIG. 1) of the ESS based on the CSI and the amount or size of the data buffered at the APs 2-4. For example, if the channel conditions from all the APs 1-4 to the CE STA and the buffered data at all the APs 1-4 are almost same, then AP1 may keep the first portion of the data and transmit the 2nd, 3rd and 4th portions of the data to the other APs 2-4 respectively in the form of data frame portions as shown in FIG. 4. Further, the AP1 may transmit the RU allocation information to AP2, AP3, and AP4, respectively, through the backbone or indicated it in the MACB-TRIGGER frame. In this example, AP1 may instruct AP2, AP3, and AP4 to use the $2^{nd}$ channel (CH2), 3rd channel (CH3) and 4th channel (CH4), respectively, and may itself use the 1st channel (CH1), each of CH1-CH4 having a 20 MHz total bandwidth, and CH1-CH4 together forming an 80 MHz channel, as shown in FIG. 4. After having sent RU allocations to APs 2-4, the master AP1 may determine if the MACB data transmission is to be initiated by AP1 or the CE STA.

If the master AP1 is to initiate the MACB transmission, then AP1 may follow the clear channel access (CCA) rules, as defined in the IEEE 802.11-2016 or in IEEE 802.11ax, for example, to access the medium. The above is depicted by way of example by the Distributed Coordination Function Interframe Space (DIFS) time period in FIG. 4 followed by the backoff period 402. The time period in FIG. 4 referred to above could also be an Interframe Space (IFS) time, or any other time period. AP1 may sense that the total 80 MHz channel is idle and may initiate a MACB transmission by transmitting duplicate request to send (RTS) frames 404a-404d on the 80 MHz channel to the CE STA. As will be explained in further detail below with respect to FIGS. 5a and 5b, only the legacy preambles of duplicate communications between the APs and the CE STA may be on respective 20 MHz channels of a 80 MHz wider channel, while the MACB portions of such duplicate communication may be on respective 2 MHz channels that are within each of the above 20 MHz channels on which duplicate legacy preambles are communicated, according to one embodiment, and as will be explained in further detail below. A packet is considered duplicated if the information contents on one bandwidth are replicated and transmitted on another bandwidth at the same time. The signal in each individual transmission that is duplicated may not be identical as between the transmissions as a result of overlay signals or antenna configuration, but the contents are identical.

Duplicate Request to Send (RTS) frames 404 may include new information in a Frame Control field thereof indicating that AP1 is requesting the MACB transmission with the participating APs 1-4. The new information may be signalled for example with the reserved bits (such as for example bits B8-B12) of the frame control field of the RTS frame 404. The bit B8 in the frame control field may be used to indicate whether the transmission mode is a single AP transmission (bit set to 0) or a multiple AP transmission (bit set to 1), as shown in Table 1 below. In the alternative, any bit in the Frame Control Field could be set to 1 to indicate a single AP transmission, and to 0 to indicate a multiple AP transmission.

If B8 is set to indicate a multiple AP transmission, the bits B9-B12 may be used to indicate which of the APi (i=1, 2, 3, 4) is requested to transmit data in the multiple-AP transmission mode (bit set to 1) or not (bit set to 0), as shown in Table 1 below:

TABLE 1

Frame control field definitions of new RTS frame

| B8 | B9 | B10 | B11 | B12 |
|---|---|---|---|---|
| Transmission mode indicator 0 = single AP 1 = multiple AP | AP1 is requested to transmit data 0 = no 1 = yes | AP2 is requested to transmit data 0 = no 1 = yes | AP3 is requested to transmit data 0 = no 1 = yes | AP4 is requested to transmit data 0 = no 1 = yes |

Upon receiving duplicate RTS frames 404 from AP1 on the 80 MHz channel, the CE STA may send duplicate Clear to Send (CTS) or MACB-Trigger frames 408a, 408b, 408c and 408d to AP1, AP2, AP3, and AP4 respectively, over the four 20 MHz channels. Similar to the RTS frames described above, and as will be explained in further detail below with respect to FIGS. 5a and 5b, only the legacy preambles of duplicate communications (such as the MACB Trigger frames here) between the APs and the CE STA may be on respective 20 MHz channels of a 80 MHz wider channel, while the MACB portions of such duplicate communication may be on respective 2 MHz channels that are within each of the above 20 MHz channels on which duplicate legacy preambles are communicated, according to one embodiment.

Referring still to FIG. 4, a Receiver Address (RA) field of the MACB-Trigger frames 408 may be set as the ESS identifier for the ESS including AP1-AP4 and the STAs associated with the same as shown by way of example in FIG. 1. All or a subset of the APs in the ESS may receive the MACB-Trigger frames 408 based on link availability. When sending its MACB-Trigger frames, the CE STA may copy the transmission mode indicator and the per AP information in the Frame Control field of RTS frame 404 it received within a Frame Control field of the MACB-Triggers frames 408 that it sends back.

Upon receiving the duplicate MACB-Trigger frames 408 from the CE STA, and based on the per AP information in the MACB-Trigger Frame Control Field, each AP receiving a corresponding MACB-Trigger frame on its corresponding 20 MHz channel may determine that that specific corresponding 20 MHz channel is clear for sending the data frame portion of the data that is being buffered at that AP (that is, if all APs AP1-AP4 receive a MACB Trigger frame as shown in FIG. 4, Data frame portion 1 to go from AP1 to CE STA, Data frame portion 2 to go from AP2 to CE STA, Data frame portion 3 to go from AP3 to CE STA, Data frame portion 4 to go from AP4 to CE STA). In this way, each AP receiving and processing a MACB Trigger frame may be cleared to transmit its downlink data frame portion to the CE STA. It is possible that not all 20 MHz channels are free. For example, an AP may have a data frame portion buffered for CE STA, but the CE STA, sensing the medium busy on its end, may not send a MACB-Trigger to that AP. In such a case, multiple options may be available, such as waiting for the medium to be free to send that remaining data portion to the CE STA, or, using the master AP to divide the data portions differently such that another AP with available resources can send the remaining data to the CE STA. Each of the APs cleared to send a corresponding data frame portion to the CE STA may adjust various parameters of their respective transmissions, such as frequency and power, and may then simultaneously transmit the data frame portions 1-4 to the CE STA over the assigned channels as depicted by the arrows emanating from each of AP1-4 toward the CE STA in FIG. 1.

After receiving the Data frame portions 1-4 from AP1-AP4 using MACB transmission, CE STA may respond with block acknowledgement (BA) frames 416a-416d, to each respective one of AP1-AP4 over the four 20 MHz channels. The duplicate BA frames 416 may indicate the acknowledgement information of all the data frame portions in frames 412 that the CE STA received from AP1-AP4.

It is to be noted that the frames shown in FIG. 4, such as the MACB-RTS', the MACB Trigger frames, the Data frame portion frames, and the BA frames may be spaced from each other in the time domain for example by an IFS time period as shown in FIG. 4.

when the duplicate MACB-RTS, MACB-Trigger and BA frames are transmitted in their entirety (i.e. their preamble portion and the MACB portion) as shown in FIG. 4 over an 80 MHz channel, the received Signal to Noise Ratio (SNR) of each frame may be about 6 dB lower than the SNR of the Data frame portion frames transmitted on a 20 MHz channel on a per AP basis. SNR is inversely proportional to white noise, and white noise is proportional to bandwidth. For an 80 MHz channel, the white noise would be four times as much as it is for a 20 MHz channel, and the SNR therefore lower, as noted above. In addition, when a STA and an AP may reach each other only by way of a 20 MHz channel, the STA and AP would not be able to exchange the four duplicate 20 MHz MACB-RTS, MACB-Trigger and BA frames to enable MACB data transmission, because an 80 MHz channel would not be available to them for the duplicate transmissions of 20 MHz each (e.g. see the graph of FIG. 2 where the data rate for 80 MHz may go to zero for a distance of about 30 meters between a STA and an AP for the shown example). In such a case, the duplicate frames may be transmitted between the STA and a number of APs, such as the four APs shown in FIG. 1, using 20 MHz per transmission. However, in such a case, because the transmission is to four different APs, the transmission power of each part of the duplicate transmission would be reduced by 4 times as compared with an instance where the transmission would be to one AP Embodiments advantageously define solutions to enable MACB data transmission by transmitting duplicate MACB-RTS, MACB-Trigger and BA frames over narrow bandwidths, that is, over bandwidths that are narrower than a bandwidth of the legacy preamble of each of those duplicate frames. For example, the duplicate MACB-RTS, MACB-Trigger and BA frames, as noted previously with respect to FIG. 4, may be transmitted over a 2 MHz channel each, while their legacy preambles may be transmitted over 20 MHz. The above may mitigate the SNR loss, such as the 6 dB SNR loss for four 20 MHz duplicate MACB-RTS, MACB-Trigger and BA frame transmissions over an 80 MHz channel as noted above. Some demonstrative embodiments advantageously enable multi-AP channel bonding data transmissions to a CE STA when the CE STA or the AP cannot reach each other over a wide bandwidth signal, such as 80 MHz.

The above may be achieved according to some demonstrative embodiments by transmitting the duplicate MACB-RTS, MACB-Trigger and BA frames over narrow bandwidths, such as a fraction of the bandwidth for transmission of their legacy preambles. Advantageously, according to some demonstrative embodiments, performance of a CE STA may be improved up to four times when there are four APs to coordinate serving the STA.

Referring now to FIGS. 5a and 5b, signaling diagrams 500a and 500b are shown depicting one of the duplicate frames of FIG. 4, such as, for example, one of the duplicate MACB-RTS, MACB-Trigger and BA frames, but with the MACB portions 511 clearly occupying a narrowband channel, that is, a fraction of the channel bandwidth of the channel occupied by the legacy preamble portion 510, and, in the particular example of FIG. 4, occupying a 2 MHz channel, that is, within the corresponding 20 MHz channel of the preamble of the transmission. Here, the Legacy Preamble 510 (which includes the Legacy Preamble in the Primary Channel CH1, and the repeated Legacy Preambles R-Legacy Preambles in the three secondary channels CH2-4) is transmitted on a 20 MHz channel in duplicate format as shown in FIG. 5a, and is followed by a MACB Preamble 512 (which includes the MACB Preamble in the Primary Channel CH1, and the repeated MACB Preambles R-MACB Preamble in the three secondary channels CH2-4) and a MACB Payload 514 (which includes the MACB Payload in the Primary Channel CH1, and the repeated MACB Payload R-MACB Payload) also in duplicate format as shown in FIG. 5a. In the context of FIGS. 5a and 5b, it is to be noted that a reference to either of CH1-CH4 refers to the 20 MHz channel used to transmit the preamble, and, in addition or in the alternative, to the narrowband 2 MHz channel associated with transmitting the MACB portion of the frame.

Each of the duplicate transmissions may have a structure as shown in more detail in FIG. 5b, in which the Legacy Preamble 510 includes a Legacy Short Training Field (L-STF) 518, a Legacy Long Training Field (L-LTF) 520, a Legacy Signal Field (L-SIG) 522 as shown. A Rate field and a Length field in the L-SIG field may be used to indicate a length of the frame that is in the process of being transmitted to third party STAs in order for the third party STAs to set their Network Allocation Vectors (NAVs) accordingly.

The Legacy Preamble 510, which occupies the wider channel bandwidth, is then followed by the MACB Preamble 512 and the MACB Payload 514 in the narrow channel as shown occupying the center narrow bandwidth (NB), the MACB Preamble 512 and MACB Payload being adapted to be decoded by a MACB-capable AP or STA. As seen in FIG. 5b, the MACB Preamble 512 may include a MACB Short Training Field (M-STF) 524, a MACB Long Training Field (M-LTF) 526, a MACB Signal Field (M-SIG) 528. The MACB Preamble may also include a Repeated Legacy Signal Field (R-L-SIG) (not shown). The M-STF 524 may be used for packet acquisition, Automatic Gain Control setting and initial course synchronization, while the M-LTF 526 may be used for channel estimation and fine synchronization. In turn, the M-SIG 528 may be used for carrying signaling information to correctly detect the NB payload. The function of each of M-STF, M-LTF and M-SIG would be known to one skilled in the art.

The MACB Payload 514 may include a MAC Header 530, followed by a MACB Payload Frame body 532, followed by a Frame Check Sequence field 534. The MACB Payload 514 may include parameters for the DL MACB transmission. The function and content of the MACB Payload 514 would correspond to well-known PHY functions for Wi-Fi systems as would be recognized by one skilled in the art.

The NB over which the MACB Preamble and MACB Payload are transmitted may include a 26 tone Resource Unit (RU) as defined in IEEE 802.11ax for a 2 MHz channel, or it may include any number of tones or subcarriers, for example any number of tones as prescribed in 802.11ax. The MACB Preamble and MACB Payload may be decoded by a MACB capable AP or STA successfully to enable a successful downlink (DL) MACB data transmission. Embodiments, by virtue of using a NB channel for transmission of the MACB portions of a frame may advantageously increase the SNR considerably, for example, in the case of the example shown in FIGS. 5a and 5b, by 10 dB.

Figure 6A:
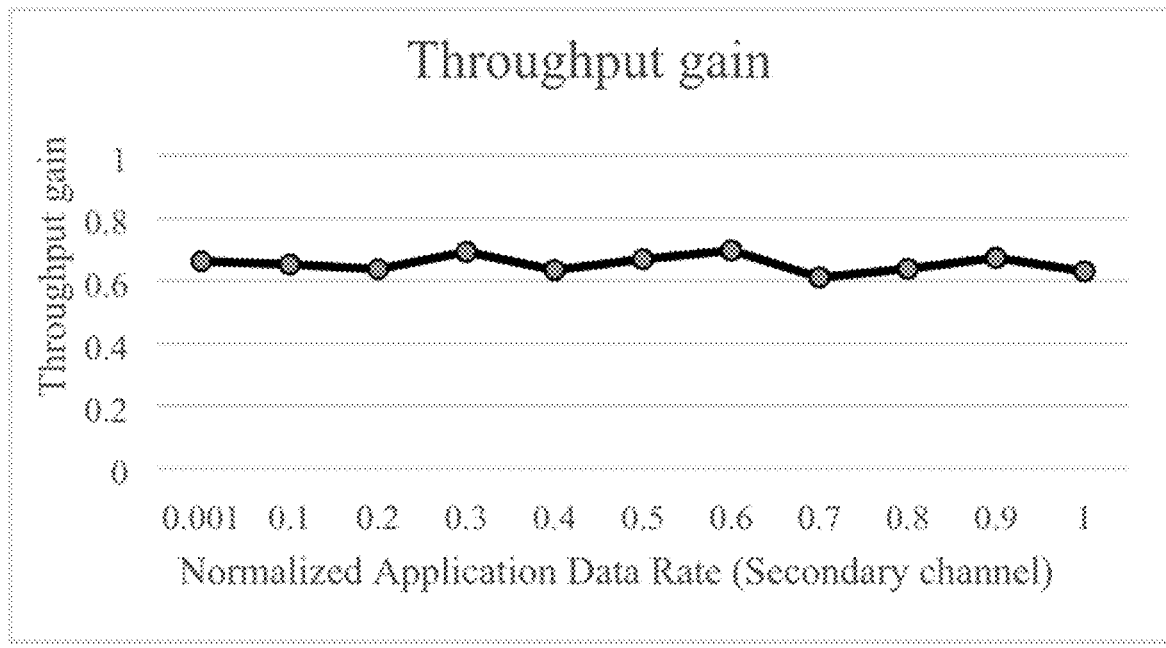
FIG. 6a is a plot of throughput gain of MACB comparing with single AP to single STA transmission versus normalized data rate for a CE STA not employing mechanisms according to embodiments.
Figure 6B:
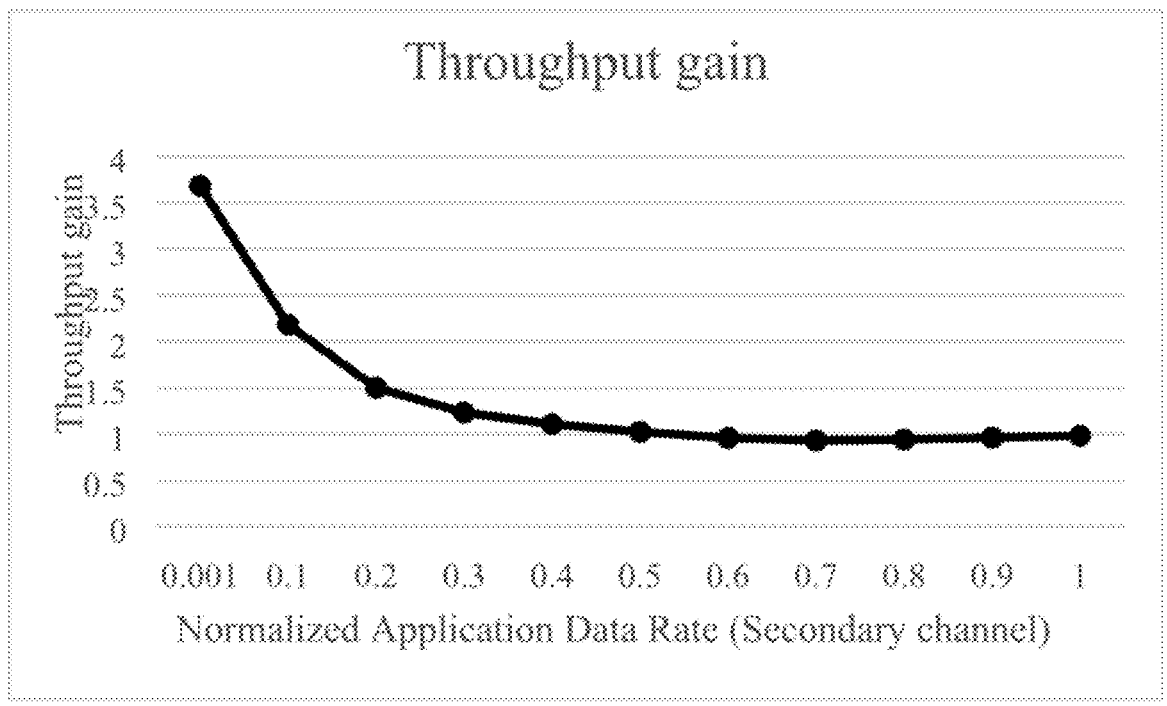
FIG. 6b is a plot similar to FIG. 6a showing throughput gain of MACB comparing with single AP to single STA transmission versus normalized data rate for a CE STA according to an embodiment.

Reference is now made to the simulation results shown in FIGS. 6a and 6b, which each plot throughput gain versus the normalized application data rate (or traffic load) on one of the secondary channels, for example one of the secondary channels CH2-CH4 of FIG. 4. The throughput gain, as would be recognized by one skilled in the art, compares the actual MACB throughput with a throughput for a transmission between a single STA and a single AP. The normalized application data rate, as would be recognized by one skilled in the art, quantifies the probability that the secondary channel would be occupied by another (third party) station.

In particular, FIG. 6a plots the throughput gain of a MACB capable AP or STA over a non MACB capable STA, when a duplicate MACB RTS, MACB Trigger or BA frame is transmitted over the whole 20 MHz bandwidth in each 20 MHz channel. We can see that, as far as the transmission of the duplicate MACB RTS, MACB Trigger or BA frame is concerned, there is no throughput gain, that is, no throughput advantage as compared with using a single STA single AP transmission, from duplicate communications using four APs even with lower normalized data rates, that is, even with a lower probability that the channel would be occupied by a third party. The above is in part because the APs and the STA are not able to reach each other with an 80 MHz signal as explained above, and are using the full 20 MHz channels for communication with each other, in this way reducing SNR.

Referring now to FIG. 6b, the latter plots the throughput gain of a MACB capable AP or STA over a non MACB capable STA, when a duplicate MACB RTS, MACB Trigger or BA frame is transmitted over a NB channel, in this case a 2 MHz RU within a larger 20 MHz channel, as depicted by way of example in FIGS. 5a and 5b. We can see that, for the embodiment for which the plot of FIG. 6b has been generated, a MACB STA may achieve more than about a 2× throughput gain when the traffic load in secondary channels is less than 10% (see the Normalized Application Data rate at 0.1, corresponding to a throughput gain of about 2). In addition, when the traffic load is at about 0.001 or 0.1%, the throughput gain is shown as increasing by about 3.7×.

As the simulation results set forth in FIGS. 6a and 6b show, embodiments advantageously increase throughput at CE STAs, and especially where the traffic load within a network may be dynamically changing, as suggested by the changing Normalized Application Data Rate in FIG. 6b. Without advantages of embodiments, a CE STA may always have relatively low throughput regardless of network traffic load. Embodiments advantageously increase throughput to a cell edge user, who would intuitively expect that, since the traffic is less, the throughput ought to increase. Therefore, embodiments advantageously improve user experience.

Reference will now be made to FIGS. 1, 3, 4, 5a and 5b in order to describe some demonstrative embodiments.

According to some demonstrative embodiments, a wireless communication device, such as, for example, baseband processing circuitry 308 of FIG. 3, comprises a memory and processing circuitry. The memory may for example correspond to baseband memory 309, and the processing circuitry may correspond to processing circuitry 310 in FIG. 3. However, embodiments are not so limited. For example, embodiments encompass within their scope a wireless communication device that may correspond to a wireless communication system such as wireless communication system 300 of FIG. 3 or to STA 101 of FIG. 1, including any one of the memories or processing circuitries therein capable of performing the below functions.

It is to be noted that references below to any aspects of the figures are merely exemplary and are not to be construed as limiting embodiments, and that embodiments therefore encompass alternatives to the specific examples from the figures provided below.

The processing circuitry, according to some demonstrative embodiments, may be configured to decode duplicate Request to Send (RTS) frames, such as RTS frames 404 of FIG. 4, from a first access point (AP), such as AP1 of FIG. 1, the first AP being part of an Extended Service Set (ESS), such as the ESS in FIG. 1, the ESS including a second AP, such as AP 2 of FIG. 1, the first AP and the second AP buffering data for the device. The processing circuitry may further be configured to cause transmission of duplicate multi-AP channel bonding (MACB) Trigger frames, such as duplicate MACB Trigger frames 408 of FIG. 4, to the first AP and to the second AP in response to the duplicate RTS frames, the duplicate MACB Trigger frames including information on wireless channels available for data transmission to the device. Each of the duplicate RTS frames and each of the duplicate Trigger frames may have a preamble portion, such as legacy preamble portion 510 of FIG. 5a, over a first bandwidth of a corresponding wireless channel, such as over 20 MHz in CH1, CH2, CH3 or CH4, and a MACB portion, such as MACB portion 511 of FIG. 5a over a second bandwidth of the corresponding wireless channel, such as over CH1, CH2, CH3 or CH4 as appropriate, the second bandwidth being narrower than the first bandwidth. The processing circuitry may further be configured to decode a first data frame portion, such as Data Frame Portion 1 from FIG. 4, from the first AP and a second data frame portion, such as Data Frame Portion 2 from FIG. 4, from the second AP, a combination of the first data frame portion and the second data frame portion including the data (that is, a combination of the first data frame portion and second data frame portion making up the data that was buffered at the first and second AP for the device). According to one embodiment, the data frame portions may overlap, either fully or partially, in the time domain as shown in FIG. 4.

According to some demonstrative embodiments, the processing circuitry may be configured to cause transmission of duplicate Request to Send (RTS) frames, such as RTS frame 404 of FIG. 4, to a wireless station (STA), such as to CE STA of FIG. 1. The processing circuitry may further be configured to decode duplicate multi-AP channel bonding (MACB) Trigger frames from the STA, such as the MACB Trigger Frames 408 of FIG. 4 sent by CE STA of FIG. 1, the duplicate MACB Trigger frames including information on wireless channels available for transmission of data to the device, wherein each of the duplicate RTS frames and each of the duplicate Trigger frames has a preamble portion, such as legacy preamble portion 510 of FIG. 5a or 5b, over a first bandwidth, such as over 20 MHz in CH1, CH2, CH3 or CH4 of a corresponding wireless channel, and a MACB portion, such as MACB portion 511 of FIG. 5a or 5b, over a second bandwidth, such as over 2 MHz in CH1, CH2, CH3 or CH4, the second bandwidth being narrower than the first bandwidth. The processing circuitry is further configured to cause transmission of a first data frame portion to the STA, such as Data Frame Portion 1 of FIG. 4 to CE STA of FIG. 1, the data including a combination of the first data frame portion, such as Data Frame Portion 1 of FIG. 4 from the device, and of second data frame portions, such as Data Frame Portions 2-4 from access points (APs) of an Extended Service Set (ESS), such as from APs 2-4 of the ESS of FIG. 1, the ESS further including the device. The processing circuitry may further be configured to cause transmission of information concerning allocation of resource units (RUs) to each of the APs for transmission of the data frame portions to the STA.

The device according to some demonstrative embodiments, such as the wireless communication device described above, may include a wireless communication system further including a baseband processing circuitry, such as, for example, baseband processing circuitry 308 of FIG. 3, the system including the memory, such as, for example memory 309 or memory 315, and the processing circuitry, such as, for example, processing circuitry 310 or application processor 311, a radio integrated circuit, such as, for example, radio IC 306 coupled to the baseband processing circuitry, and a front-end module, such as, for example, FEM circuitry 304 coupled to the radio integrated circuitry. The system may further include a plurality of antennas coupled to the radio IC circuitry, such as antennas 301.

FIG. 7 illustrates a method 700 of using a wireless communication device in accordance with some demonstrative embodiments. The method 700 may begin with operation 702, which includes decoding duplicate Request to Send (RTS) frames from a first access point (AP), the first AP being part of an Extended Service Set (ESS) including a second AP, the first AP and the second AP buffering data for the device. At operation 704, the method may include, causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth. At operation 706, the method may include decoding a first data frame portion from the first AP and a second data frame portion from the second AP, a combination of the first data frame portion and the second data frame portion including the data.

FIG. 8 illustrates a product of manufacture 802, in accordance with some demonstrative embodiments. Product 802 may include one or more tangible computer-readable non-transitory storage media 804, which may include computer-executable instructions, e.g., implemented by logic 806, operable to, when executed by at least one computer processor, cause the at least one computer processor to implement one or more operations at a STA or an AP, and/or to perform one or more operations described above with respect to FIGS. 1, 3, 4, 5a and 5b, and/or one or more operations described herein. The phrase "non-transitory machine-readable medium" is directed to include all computer-readable media, with the sole exception being a transitory propagating signal.

In some demonstrative embodiments, product 802 and/or storage media 804 may include one or more types of computer-readable storage media capable of storing data, including volatile memory, non-volatile memory, removable or non-removable memory, erasable or non-erasable memory, writeable or re-writeable memory, and the like. For example, storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the wireless communication system of FIG. 3 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Examples

The following examples pertain to further embodiments.

Example 1 includes a wireless communication device comprising a memory and processing circuitry, the processing circuitry including logic and being configured to decode duplicate Request to Send (RTS) frames from a first access point (AP), the first AP being part of an Extended Service Set (ESS) including a second AP, the first AP and the second AP buffering data for the device; cause transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; decode a first data frame portion from the first AP and a second data frame portion from the second AP, a combination of the first data frame portion and the second data frame portion including the data.

Example 2 includes the subject matter of Example 1, and optionally, wherein the processing circuitry is further to cause transmission of duplicate Block Acknowledgment (BA) frames to the first AP and the second AP, wherein each of the duplicate BA frames has a legacy preamble portion over the first bandwidth, and a MACB portion over the second bandwidth.

Example 3 includes the subject matter of Example 1, and optionally, wherein the duplicate RTS frames include information on which ones of the APs of the ESS are buffering data for the device.

Example 4 includes the subject matter of Example 3, and optionally, wherein the duplicate RTS frames include a Frame Control Field, wherein one or more bits of the Frame Control Field include the information on which ones of the APs of the ESS are buffering data for the device.

Example 5 includes the subject matter of Example 4, and optionally, wherein the ESS further includes a third AP and a fourth AP, and wherein the processing circuitry is to cause transmission of the duplicate MACB Trigger frames to each of the first AP, the second AP, the third AP and the fourth AP in response to the duplicate RTS frames; decode the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

Example 6 includes the subject matter of Example 5, and optionally, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

Example 7 includes the subject matter of any one of Examples 1-6, and optionally, wherein the first bandwidth is a 20 MHz bandwidth, and the second bandwidth is a 2 MHz bandwidth.

Example 8 includes the subject matter of any one of Examples 1-6, and optionally, wherein the second bandwidth is a 2 MHz bandwidth, and wherein the MACB portion is transmitted over a 26 tone Resource Unit (RU).

Example 9 includes the subject matter of any one of Examples 1-6, and optionally, wherein the Legacy Preamble portion includes a Legacy Short Training field (L-STF), a Legacy Long Training field (L-LTF), and a Legacy Signal field (L-SIG).

Example 10 includes the subject matter of any one of Examples 1-6, and optionally, wherein the MACB portion includes a MACB preamble, a payload and a Frame Check Sequence field (FCS).

Example 11 includes a product comprising one or more tangible computer-readable non-transitory storage media comprising computer-executable instructions operable to, when executed by at least one computer processor, cause the at least one computer processor to implement operations at a wireless communication device, the operations comprising: decoding duplicate Request to Send (RTS) frames from a first access point (AP), the first AP being part of an Extended Service Set (ESS) including a second AP, the first AP and the second AP buffering data for the device; causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; and decoding a first data frame portion from the first AP and a second data frame portion from the second AP, a combination of the first data frame portion and the second data frame portion including the data.

Example 12 includes the subject matter of Example 11, and optionally, wherein the operations further include causing transmission of duplicate Block Acknowledgment (BA) frames to the first AP and the second AP, wherein each of the duplicate BA frames has a legacy preamble portion over the first bandwidth, and a MACB portion over the second bandwidth.

Example 13 includes the subject matter of Example 11, and optionally, wherein the duplicate RTS frames include information on which ones of the APs of the ESS are buffering data for the device.

Example 14 includes the subject matter of Example 13, and optionally, wherein the duplicate RTS frames include a Frame Control Field, wherein one or more bits of the Frame Control Field include the information on which ones of the APs of the ESS are buffering data for the device.

Example 15 includes the subject matter of Example 14, and optionally, wherein the ESS further includes a third AP and a fourth AP, and wherein the operations further include: causing transmission of the duplicate MACB Trigger frames to each of the first AP, the second AP, the third AP and the fourth AP in response to the duplicate RTS frames; decoding the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

Example 16 includes the subject matter of Example 15, and optionally, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

Example 17 includes the subject matter of any one of Examples 11-16, and optionally, wherein the first bandwidth is a 20 MHz bandwidth, and the second bandwidth is a 2 MHz bandwidth.

Example 18 includes the subject matter of any one of Examples 11-16, and optionally, wherein the second bandwidth is a 2 MHz bandwidth, and wherein the MACB portion is transmitted over a 26 tone Resource Unit (RU).

Example 19 includes the subject matter of any one of Examples 11-16, and optionally, wherein the Legacy Preamble portion includes a Legacy Short Training field (L-STF), a Legacy Long Training field (L-LTF), and a Legacy Signal field (L-SIG).

Example 20 includes the subject matter of any one of Examples 11-16, and optionally, wherein the MACB portion includes a MACB preamble, a payload and a Frame Check Sequence field (FCS).

Example 21 includes a method of operating a wireless communication device, the method comprising: decoding duplicate Request to Send (RTS) frames from a first access point (AP), the first AP being part of an Extended Service Set (ESS) including a second AP, the first AP and the second AP buffering data for the device; causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; and decoding a first data frame portion from the first AP and a second data frame portion from the second AP, a combination of the first data frame portion and the second data frame portion including the data.

Example 22 includes the subject matter of Example 21, and optionally, further including causing transmission of duplicate Block Acknowledgment (BA) frames to the first AP and the second AP, wherein each of the duplicate BA frames has a legacy preamble portion over the first bandwidth, and a MACB portion over the second bandwidth.

Example 23 includes the subject matter of Example 21, and optionally, wherein the duplicate RTS frames include information on which ones of the APs of the ESS are buffering data for the device.

Example 24 includes the subject matter of Example 23, and optionally, wherein the duplicate RTS frames include a Frame Control Field, wherein one or more bits of the Frame Control Field include the information on which ones of the APs of the ESS are buffering data for the device.

Example 25 includes the subject matter of Example 24, and optionally, wherein the ESS further includes a third AP and a fourth AP, and wherein the operations further include: causing transmission of the duplicate MACB Trigger frames to each of the first AP, the second AP, the third AP and the fourth AP in response to the duplicate RTS frames; decoding the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

Example 26 includes the subject matter of Example 25, and optionally, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

Example 27 includes the subject matter of any one of Examples 21-26, and optionally, wherein the first bandwidth is a 20 MHz bandwidth, and the second bandwidth is a 2 MHz bandwidth.

Example 28 includes the subject matter of any one of Examples 21-26, and optionally, wherein the second bandwidth is a 2 MHz bandwidth, and wherein the MACB portion is transmitted over a 26 tone Resource Unit (RU).

Example 29 includes the subject matter of any one of Examples 21-26, and optionally, wherein the Legacy Preamble portion includes a Legacy Short Training field (L-STF), a Legacy Long Training field (L-LTF), and a Legacy Signal field (L-SIG).

Example 30 includes the subject matter of any one of Examples 21-26, and optionally, wherein the MACB portion includes a MACB preamble, a payload and a Frame Check Sequence field (FCS).

Example 31 includes a wireless communication device comprising a memory and processing circuitry, the processing circuitry including logic and being configured to: cause transmission of duplicate Request to Send (RTS) frames to a wireless station (STA); decode duplicate multi-AP channel bonding (MACB) Trigger frames from the STA, the duplicate MACB Trigger frames including information on wireless channels available for transmission of data to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; cause transmission of a first data frame portion to the STA, the data including a combination of the first data frame portion from the device and of second data frame portions from access points (APs) of an Extended Service Set (ESS) including the device.

Example 32 includes the subject matter of Example 31, and optionally, wherein the processing circuitry is further to cause transmission of information concerning allocation of resource units (RUs) to each of the APs for transmission of the data frame portions to the STA.

Example 33 includes the subject matter of Example 31, and optionally, wherein the processing circuitry is further to decode duplicate Block Acknowledgment (BA) frames from the STA, wherein each of the duplicate BA frames has a legacy preamble portion over the first bandwidth, and a MACB portion over the second bandwidth.

Example 34 includes the subject matter of Example 31, and optionally, wherein the duplicate RTS frames include information on which ones of the APs of the ESS are buffering data for the device.

Example 35 includes the subject matter of Example 34, and optionally, wherein the duplicate RTS frames include a Frame Control Field, wherein one or more bits of the Frame Control Field include the information on which ones of the APs of the ESS are buffering data for the device.

Example 36 includes the subject matter of Example 35, and optionally, wherein the one or more bits include four bits, each of the four bits corresponding to an AP of the ESS, each of the four bits further having a first value to indicate that a corresponding AP has buffered data for the device, and a second value to indicate that the corresponding AP does not have buffered data for the device.

Example 37 includes the subject matter of any one of Examples 31-36, and optionally, wherein the first bandwidth is a 20 MHz bandwidth, and the second bandwidth is a 2 MHz bandwidth.

Example 38 includes the subject matter of any one of Examples 31-36, and optionally, wherein the second bandwidth is a 2 MHz bandwidth, and wherein the MACB portion is transmitted over a 26 tone Resource Unit (RU).

Example 39 includes the subject matter of any one of Examples 31-36, and optionally, wherein the Legacy Preamble portion includes a Legacy Short Training field (L-STF), a Legacy Long Training field (L-LTF), and a Legacy Signal field (L-SIG).

Example 40 includes the subject matter of any one of Examples 31-36, and optionally, wherein the MACB portion includes a MACB preamble, a payload and a Frame Check Sequence field (FCS).

Example 41 includes a product comprising one or more tangible computer-readable non-transitory storage media comprising computer-executable instructions operable to, when executed by at least one computer processor, cause the at least one computer processor to implement operations at a wireless communication device, the operations comprising: causing transmission of duplicate Request to Send (RTS) frames to a wireless station (STA); decoding duplicate multi-AP channel bonding (MACB) Trigger frames from the STA, the duplicate MACB Trigger frames including information on wireless channels available for transmission of data to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; causing transmission of a first data frame portion to the STA, the data including a combination of the first data frame portion from the device and of second data frame portions from access points (APs) of an Extended Service Set (ESS) including the device.

Example 42 includes the subject matter of Example 41, and optionally, wherein the operations further include causing transmission of information concerning allocation of resource units (RUs) to each of the APs for transmission of the data frame portions to the STA.

Example 43 includes the subject matter of Example 41, and optionally, wherein the operations further include duplicating Block Acknowledgment (BA) frames from the STA, wherein each of the duplicate BA frames has a legacy preamble portion over the first bandwidth, and a MACB portion over the second bandwidth.

Example 44 includes the subject matter of Example 41, and optionally, wherein the duplicate RTS frames include information on which ones of the APs of the ESS are buffering data for the device.

Example 45 includes the subject matter of Example 44, and optionally, wherein the duplicate RTS frames include a Frame Control Field, wherein one or more bits of the Frame Control Field include the information on which ones of the APs of the ESS are buffering data for the device.

Example 46 includes the subject matter of Example 45, and optionally, wherein the one or more bits include four bits, each of the four bits corresponding to an AP of the ESS, each of the four bits further having a first value to indicate that a corresponding AP has buffered data for the device, and a second value to indicate that the corresponding AP does not have buffered data for the device.

Example 47 includes the subject matter of any one of Examples 41-46, and optionally, wherein the first bandwidth is a 20 MHz bandwidth, and the second bandwidth is a 2 MHz bandwidth.

Example 48 includes the subject matter of any one of Examples 41-46, and optionally, wherein the second bandwidth is a 2 MHz bandwidth, and wherein the MACB portion is transmitted over a 26 tone Resource Unit (RU).

Example 49 includes the subject matter of any one of Examples 41-46, and optionally, wherein the Legacy Preamble portion includes a Legacy Short Training field (L-STF), a Legacy Long Training field (L-LTF), and a Legacy Signal field (L-SIG).

Example 50 includes the subject matter of any one of Examples 41-46, and optionally, wherein the MACB portion includes a MACB preamble, a payload and a Frame Check Sequence field (FCS).

Example 51 includes a method of operating a wireless communication device comprising: causing transmission of duplicate Request to Send (RTS) frames to a wireless station (STA); decoding duplicate multi-AP channel bonding (MACB) Trigger frames from the STA, the duplicate MACB Trigger frames including information on wireless channels available for transmission of data to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; causing transmission of a first data frame portion to the STA, the data including a combination of the first data frame portion from the device and of second data frame portions from access points (APs) of an Extended Service Set (ESS) including the device.

Example 52 includes the subject matter of Example 51, and optionally, further including causing transmission of information concerning allocation of resource units (RUs) to each of the APs for transmission of the data frame portions to the STA.

Example 53 includes the subject matter of Example 51, and optionally, wherein the operations further include duplicating Block Acknowledgment (BA) frames from the STA, wherein each of the duplicate BA frames has a legacy preamble portion over the first bandwidth, and a MACB portion over the second bandwidth.

Example 54 includes the subject matter of Example 51, and optionally, wherein the duplicate RTS frames include information on which ones of the APs of the ESS are buffering data for the device.

Example 55 includes the subject matter of Example 54, and optionally, wherein the duplicate RTS frames include a Frame Control Field, wherein one or more bits of the Frame Control Field include the information on which ones of the APs of the ESS are buffering data for the device.

Example 56 includes the subject matter of Example 55, and optionally, wherein the one or more bits include four bits, each of the four bits corresponding to an AP of the ESS, each of the four bits further having a first value to indicate that a corresponding AP has buffered data for the device, and a second value to indicate that the corresponding AP does not have buffered data for the device.

Example 57 includes the subject matter of any one of Examples 51-56, and optionally, wherein the first bandwidth is a 20 MHz bandwidth, and the second bandwidth is a 2 MHz bandwidth.

Example 58 includes the subject matter of any one of Examples 51-56, and optionally, wherein the second bandwidth is a 2 MHz bandwidth, and wherein the MACB portion is transmitted over a 26 tone Resource Unit (RU).

Example 59 includes the subject matter of any one of Examples 51-56, and optionally, wherein the Legacy Preamble portion includes a Legacy Short Training field (L-STF), a Legacy Long Training field (L-LTF), and a Legacy Signal field (L-SIG).

Example 60 includes the subject matter of any one of Examples 51-56, and optionally, wherein the MACB portion includes a MACB preamble, a payload and a Frame Check Sequence field (FCS).

What is claimed is:

1. A wireless communication device comprising a memory and processing circuitry, the processing circuitry including logic and being configured to:
   decode duplicate Request to Send (RTS) frames from a first access point (AP), the first AP being part of an Extended Service Set (ESS) including a second AP, the first AP and the second AP buffering data for the device;

cause transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; and decode a first data frame portion from the first AP and a second data frame portion from the second AP, a combination of the first data frame portion and the second data frame portion including the data.

2. The device of claim 1, wherein the processing circuitry is further to cause transmission of duplicate Block Acknowledgment (BA) frames to the first AP and the second AP, wherein each of the duplicate BA frames has a legacy preamble portion over the first bandwidth, and a MACB portion over the second bandwidth.

3. The device of claim 1, wherein the duplicate RTS frames include information on which ones of the APs of the ESS are buffering data for the device.

4. The device of claim 3, wherein the duplicate RTS frames include a Frame Control Field, wherein one or more bits of the Frame Control Field include the information on which ones of the APs of the ESS are buffering data for the device.

5. The device of claim 4, wherein the ESS further includes a third AP and a fourth AP, and wherein the processing circuitry is to:

cause transmission of the duplicate MACB Trigger frames to each of the first AP, the second AP, the third AP and the fourth AP in response to the duplicate RTS frames; and decode the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

6. The device of claim 5, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

7. The device of claim 1, wherein the first bandwidth is a 20 MHz bandwidth, and the second bandwidth is a 2 MHz bandwidth.

8. The device of claim 1, wherein the second bandwidth is a 2 MHz bandwidth, and wherein the MACB portion is transmitted over a 26 tone Resource Unit (RU).

9. The device of claim 1, further including a radio integrated circuit coupled to the processing circuit, and a front-end module coupled to the radio integrated circuit.

10. The device of claim 9, further including one or more antennas coupled to the front-end module.

11. A product comprising one or more tangible computer-readable non-transitory storage media comprising computer-executable instructions operable to, when executed by at least one computer processor, cause the at least one computer processor to implement operations at a wireless communication device, the operations comprising:

decoding duplicate Request to Send (RTS) frames from a first access point (AP), the first AP being part of an Extended Service Set (ESS) including a second AP, the first AP and the second AP buffering data for the device;

causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; and decoding a first data frame portion from the first AP and a second data frame portion from the second AP, a combination of the first data frame portion and the second data frame portion including the data.

12. The product of claim 11, wherein the operations further include causing transmission of duplicate Block Acknowledgment (BA) frames to the first AP and the second AP, wherein each of the duplicate BA frames has a legacy preamble portion over the first bandwidth, and a MACB portion over the second bandwidth.

13. The product of claim 11, wherein the duplicate RTS frames include a Frame Control Field, wherein one or more bits of the Frame Control Field include information on which ones of the APs of the ESS are buffering data for the device.

14. The product of claim 13, wherein the ESS further includes a third AP and a fourth AP, and wherein the operations further include:

causing transmission of the duplicate MACB Trigger frames to each of the first AP, the second AP, the third AP and the fourth AP in response to the duplicate RTS frames; and decoding the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

15. The product of claim 14, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

16. The product of claim 11, wherein the first bandwidth is a 20 MHz bandwidth, and the second bandwidth is a 2 MHz bandwidth.

17. The product of claim 11, wherein the MACB portion includes a MACB preamble, a payload and a Frame Check Sequence field (FCS).

18. A method of operating a wireless communication device, the method comprising:

decoding duplicate Request to Send (RTS) frames from a first access point (AP), the first AP being part of an Extended Service Set (ESS) including a second AP, the first AP and the second AP buffering data for the device;

causing transmission of duplicate multi-AP channel bonding (MACB) Trigger frames to the first AP and to the second AP in response to the duplicate RTS frames, the duplicate MACB Trigger frames including information on wireless channels available for data transmission to the device, wherein each of the duplicate RTS frames and each of the duplicate Trigger frames has a legacy preamble portion over a first bandwidth of a corresponding wireless channel, and a MACB portion over a second bandwidth of the corresponding wireless channel, the second bandwidth being narrower than the first bandwidth; and decoding a first data frame portion from the first AP and a second data frame portion from the second AP, a combination of the first data frame portion and the second data frame portion including the data.

19. The method of claim 18, further including causing transmission of duplicate Block Acknowledgment (BA) frames to the first AP and the second AP, wherein each of the duplicate BA frames has a legacy preamble portion over the first bandwidth, and a MACB portion over the second bandwidth.

20. The method of claim 18, wherein the duplicate RTS frames include a Frame Control Field, wherein one or more bits of the Frame Control Field include information on which ones of the APs of the ESS are buffering data for the device.

21. The method of claim 20, wherein the ESS further includes a third AP and a fourth AP, and wherein the operations further include:

causing transmission of the duplicate MACB Trigger frames to each of the first AP, the second AP, the third AP and the fourth AP in response to the duplicate RTS frames; and decoding the first data frame portion from the first AP, the second data frame portion from the second AP, a third data frame portion from the third AP, and a fourth data frame portion from the fourth AP, a combination of the first data frame portion, the second data frame portion, the third data frame portion and the fourth data frame portion including the data.

22. The method of claim 21, wherein the one or more bits include four bits, each of the four bits corresponding to one of the first AP, the second AP, the third AP and the fourth AP, each of the four bits further having a first value to indicate that a corresponding AP has buffered data for the device, and a second value to indicate that the corresponding AP does not have buffered data for the device.

23. The method of claim 21, wherein the first bandwidth is a 20 MHz bandwidth, and the second bandwidth is a 2 MHz bandwidth.

24. The method of claim 21, wherein the second bandwidth is a 2 MHz bandwidth, and wherein the MACB portion is transmitted over a 26 tone Resource Unit (RU).

25. The method of claim 21, wherein the MACB portion includes a MACB preamble, a payload and a Frame Check Sequence field (FCS).

* * * * *